Dec. 4, 1945.  W. H. COLBERT  2,390,424
MIRROR OR REFLECTOR
Filed March 20, 1943  2 Sheets-Sheet 1

INVENTOR.
William H. Colbert.
BY
ATTORNEYS

Dec. 4, 1945.  W. H. COLBERT  2,390,424
MIRROR OR REFLECTOR
Filed March 20, 1943  2 Sheets-Sheet 2

INVENTOR.
William H. Colbert
BY
ATTORNEYS

Patented Dec. 4, 1945

2,390,424

UNITED STATES PATENT OFFICE 2,390,424

MIRROR OR REFLECTOR

William H. Colbert, Brackenridge, Pa., assignor, by mesne assignments, to Libbey-Owens-Ford Glass Company, Toledo, Ohio, a corporation of Ohio Application March 20, 1943, Serial No. 479,929

1 Claim. (Cl. 88—105)

This invention relates to mirrors or reflectors. It has to do, more particularly, with first surface mirrors or reflectors adapted particularly, although not exclusively, for use in aircraft, motor vehicles, boats and various other types of mobile units. Mirrors or reflectors embodying the present invention are not, however, necessarily limited to use in mobile units since their use is widespread and applicable to many other fields.

It is a simple matter to provide rear vision in vehicles travelling on the earth's surface. It is another matter, however, to provide satisfactory rear vision in aircraft. In the air, motion is in all directions, with sharp turns, at high speeds and under rapidly changing atmospheric conditions. Adequate rear vision is much more important in a war plane than in any other vehicle of war. Adequate rear vision in war planes often means the difference between the loss of the plane and its occupant or occupants, and the performance of the task at hand; many times it means the difference between defeat and victory in an engagement.

Devices now in use for securing some sort of rear vision in aircraft of the United Nations range from inexpensive automobile and truck mirrors to very expensive optical instruments. Such devices have been found to be unsatisfactory and quite inadequate for the purpose intended. It is the consensus of opinion of Army and Navy experts, aircraft engineers, test pilots and war pilots with actual combat experience, that more efficient rear vision equipment or devices than those provided by the prior art are necessary. The pilot must be able to see clearly, instantly, and from any position in which his eye happens to be when his immediate knowledge of what is going on in the rear is vital. He does not have the time to hunt and find the exact area from which he can focus his line of vision. He cannot afford the detrimental and time-consuming action his eyes will make involuntarily to see clearly a distorted, blurred, or obscure image. Such involuntary eye action takes valuable time and causes eye strain.

Only single images are clear and they come only from first surface mirrors. All second surface mirrors reflect two images, one from each surface. Even if the two surfaces are optically ground and polished parallel, two images are still seen when viewed from sharp angles. In addition to being sharp and distinct, the images the pilot sees should be uniform within the device regardless of the area of the device that presents the image to him. On most mirrors in use today, if the mirror is held stationary, and the viewer takes the time to orient his eyes to the area he is using, he can in most cases permit his eyes to make the involuntary effort to correct the first impression and determine in the blurred image that only one plane, for example, is actually in the field of view. But the pilot whose plane is in motion at high speed has no time for such effort. He has only the time to take the slightest glance at the mirror. He should have a mirror which will not mislead and confuse him.

It has been determined by many trial and error tests taking into consideration the low visibility of dawn and dusk as opposed to the glare of high noon sun and the poor visibility in cloud banks as opposed to the ideal conditions of clear sky, as well as the absorption values of the lens in the pilot's goggles, that the ideal reflectivity of a rear view mirror or reflector is approximately 50%.

It is, therefore, one of the objects of the present invention to provide an improved mirror or reflector having a reflectivity of approximately 50%.

Another object of the invention is to provide an improved mirror of high clarity free of multiple images and other sources of visual confusion while having a wide field of view.

A further object of the invention is to provide an improved mirror or reflector which is particularly well adapted for use in aircraft and one in which the minimum degree of reflectivity is approximately 40% and the maximum degree of reflectivity does not exceed approximately 80%.

A further object of the invention is to provide an improved first surface mirror capable of reflecting a field or area of considerably greater size or dimensions in proportion to the size of the reflecting surface than has been possible with previously known mirrors.

Another object of the invention is to provide an improved mirror or reflector which is relatively easy and inexpensive to manufacture, one in which the mirror surface has relatively high scratch resistance characteristics, and one which is capable of withstanding sudden changes in climatic conditions and is not affected by moisture.

Generally speaking, my invention comprises an improved first surface mirror composed of a support or body portion having a preferably convex or spherical face surface to which is applied a film or coating of material having high light reflecting qualities which are toned down to a desirable degree within a range of from 40% to 60% reflectivity by the use of an opaque light absorbing support or an opaque coating or layer on a transparent support to absorb a portion of the light rays.

The foregoing and other objects and advantages of the invention will appear from the following description and appended claims when considered in connection with the accompanying drawings forming a part of this specification wherein like reference characters designate similar parts in the several views.

Figure 1:
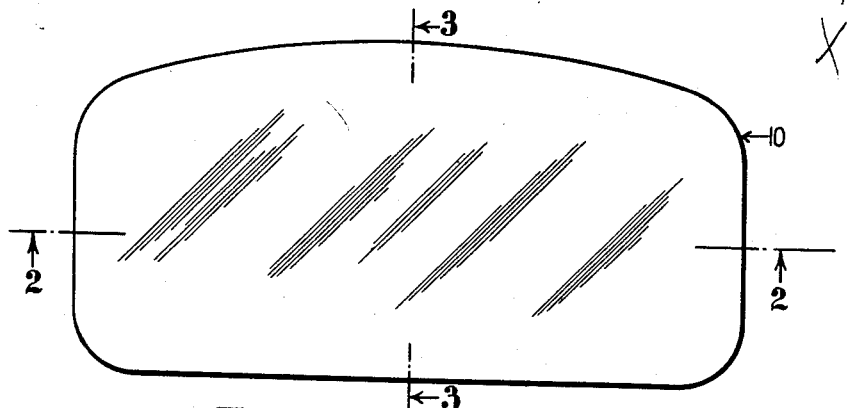
Figure 1 is a front elevational view of a preferred form of mirror or reflector, embodying the invention.

A mirror or reflector embodying the present invention, when used in an airplane, for example, provides means to quickly afford the pilot a rapid survey to the rear, above and to either or both sides of the craft for quickly locating thereby enemy (or other) planes. The mirror also serves the function of eliminating the normal blindness of a large plane as it attempts to make a landing, since by suitable mirror combinations, the ground immediately over the nose of the plane is made visible and the positions or locations of planes to the rear is apparent. While the invention will be described somewhat more particularly with respect to its use in aircraft, the mirror may be used in any type of vehicle, as mentioned above and more particularly as a rear view mirror in automobiles.

In the modern war plane the speed of travel is so fast that the pilot, particularly during combat, has little opportunity to look around in order to determine the location of his own plane and that or those of the enemy. The use of mirrors placed before the pilot presents a means of rapidly evaluating surrounding conditions without the pilot necessarily, for more than an instant, taking his attention from the direction in which the plane is travelling and interfering with his control of the plane. Since it is desirable that the pilot be enabled to see out backwards and to either side, as well as above and below the position of his plane, several mirrors have frequently been used. It is apparent, however, that each mirror should provide as wide a field of view as is possible. Cramped quarters in the cockpit obviously limit the airplane mirror to a small area thus intensifying the difficulty of securing a satisfactory area of view or vision because the mirrors are necessarily of small dimensions.

The pilot must be able to see clearly, instantly, and from any position in which his eye happens to be when his immediate knowledge of what is going on in the rear is vital. He has no time to hunt and find the exact area from which he can focus his line of vision. He cannot afford the detrimental and time-consuming action his eyes will make involuntarily to see clearly a distorted, blurred, or obscure image. This involuntary eye action takes valuable time and causes eye strain; neither can be expended.

There must not be any glare in the mirror surface because glare causes the pilot to lose valuable time in focusing while the pupil opening of the eye changes its size to take care of such conditions. The use of silvered mirrors of 90% reflectivity, for example, has been particularly objectionable at high altitudes when the reflection of white clouds was suddenly viewed in one of the mirrors, since the pilot's eye was accommodated to a much lower intensity of illumination due to the fact that his eye was normally focused on far distant objects and to general reflection from the surrounding cloudless sky which offered a much lower intensity of light.

I have discovered through practical and scientific trials and tests that a mirror whose surface reflected approximately 50% of the incident light satisfactorily, reduced considerably the glare to which the eye was subjected while flying in an airplane due to the contrast of clouds versus cloudless sky. With a mirror having approximately a 50% reflectivity characteristic as contrasted with a silvered mirror of from 90% to 94% reflectivity, it was discovered that a direct reflection from the sun does not upset one's optical response, whereas with the silvered mirror mentioned, such direct sun reflection or dazzle temporarily blinded the pilot for several seconds. Moreover, with a mirror having about 50% reflectivity, adequate eye visibility for distant objects was presented.

A mirror made in accordance with the present invention reduces the amount of continuous fatigue to which a fighter plane pilot is subjected. A pilot uses clear goggles in morning flights but around noon and at high altitudes, because of the presence of an increasing amount of ultraviolet rays, it becomes necessary for him to wear goggles with dark lenses. Use of the present mirror tends to reduce the general loss of sensitivity of the eye when exposed to the light for a long period of time.

I discovered further that flat surface mirrors or reflectors do not give the desired wide angle of vision essential for successful use in aircraft. Therefore, my improved mirror is provided with a convex or spherical face or reflecting surface which greatly increases the angle of view thereby taking in vision to either side of and above and below the airplane. Objects or images which appear in a mirror of this type are immediately demagnified to the same degree. Therefore, the images seen in any part of the mirror are completely uniform. It is thereby possible for the pilot to estimate without error the distance away of an enemy plane irrespective of the part or portion of the mirror surface in which the image appears.

Only single images are clear. Single images come only from first surface mirrors. All second surface mirrors reflect two images, one from each surface. Even if the two surfaces are optically ground and polished parallel, two images are seen when viewed from sharp angles.

In addition to being sharp and distinct, the images the pilot sees should be uniform within the device regardless of the area of the device that presents the image to him. To see a plane apparently considerably distant in one area of the device and apparently on the tail in another area is confusing. To see what is apparently one plane in one area of the device, and what are apparently two planes in another area is confusing. To add such confusion to the pilot at the instant of his peak strain may be fatal. In any event, it is harmful and unfair to the pilot. The double plane image phenomenon expressed here is not an exaggerated or imaginative idea. On most mirrors in use today, if the mirror is held stationary, and the viewer takes the time to orient his eyes to the area he is using, he can in most cases permit his eyes to make the involuntary effort to correct the first impression and determine in the blurred image that only one plane is actually in the field of view. But the pilot whose plane is in motion at high speed has no time for such effort; he has many other things to do. All he can give the mirror is the slightest glance, and mirrors made in accordance with the present invention will not mislead and confuse him.

The face or surface of the support or body portion of the mirror, such as glass which carries the mirror film, is preferably optically ground to extremely high polish so that the mirror will present a very high degree of clarity. If the front surface of the glass or other support is optically ground and polished to a convex or spherical surface having a radius of curvature of approximately one thousand (1000) millimeters, the pilot will be afforded a field of vision, with his eye located eighteen (18) inches from the mirror, of approximately six hundred (600) feet across at one thousand (1000) feet to the rear of the plane, assuming the mirror surface is of a width of five (5) inches. The demagnification of this mirror is 2 to 1. The field of view increases as the aviator's eye is moved closer to the mirror. I may use mirrors having different radii of surface curvature depending upon the field of view desired and limitations as to demagnification. As a further example I have found a surface ground and polished to a radius of surface curvature of 685 millimeters to also be of use. This gives a wider angle of view and consequently under the above conditions one can see easily through a width of 760 feet at 1000 feet back of the plane where the mirror surface is again 5 inches wide. The demagnification of this mirror is 2½ to 1. I have found that demagnification of greater than 2½ to 1 reduces the size of the objects too much for use in an airplane.

The desired reflectivity of 50% of mirrors for airplane use may be varied from 40% to 60% without sacrificing too much visibility at the lower reflection percentage or developing too much glare in the higher reflection percentages. To secure the proper amount of reflection within this desired range, I have found it necessary to develop a new and improved type of mirror reflecting surface. I have discovered that the reflectivity of metal films is only a fixed value when the films are of a thickness sufficient to make them completely opaque and that if a semi-transparent film of reflecting material is deposited upon a support that the reflecting value of the film varies with the thickness of the film and becomes greater as the transparency decreases. It thus becomes possible to make mirrors of a desired reflection value by depositing on a support very small thicknesses of metals or other reflective materials in semi-transparent films. As such films are semi-transparent however, confusion arises when an attempt to use these as mirrors is made, since one can see through the mirror and observe objects on the other side of the mirror. This naturally leads to confusion of the object seen through the mirror with the images seen in the mirror. I have learned that this condition can be corrected by making a first surface mirror of desired reflectivity by depositing a semi-transparent reflective mirror layer upon the first surface of an opaque support, such as opaque glass. The light which is transmitted through the mirror layer is absorbed in the opaque glass or other opaque material constituting the support and the object in the background is obscured.

Figure 2:
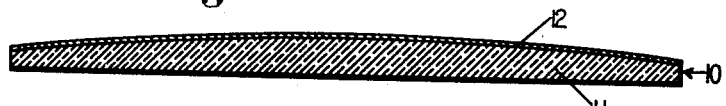
Figure 2 is a longitudinal sectional view taken substantially along the line 2O2 of Figure 1, looking in the direction of the arrows.
Figure 3:
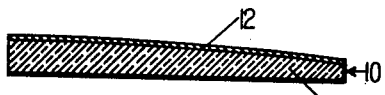
Figure 3 is a transverse sectional view taken substantially along the line 3—3 of Figure 1, looking in the direction of the arrows.

Referring now particularly to Figures 1, 2 and 3 of the drawings, there is shown one form of improved first surface mirror or reflector embodying the invention. In these figures the mirror is shown as a whole at 10 and comprises a support or body portion 11 formed of suitable opaque material, such as opaque black or opaque deeply colored glass. As best seen in Figures 2 and 3, the front face or surface of the support 11 is convex or spherical in all directions. This spherical surface is subjected to optical grinding and polishing to give the convex surface an extremely high polish having a radius of curvature of approximately one thousand (1000) millimeters. The convex or spherical face of the support is provided with a coating or film 12 of a semi-transparent reflecting material or substance, such as chromium, which has a reflectivity of less than 80% which is desirable for various uses. When the mirror 10 is to be used in connection with aircraft, the coating, layer or film 12 is controlled as to thickness and density to provide the mirror with a reflectivity of approximately 40% to 60%, with a most desirable reflectivity characteristic of about 50%.

Figure 4:
Figure 4 is a view similar to Figure 2 showing a modified form of mirror or reflector embodying the invention.

In Figure 4 there is shown a longitudinal section through a somewhat modified form of mirror having the same shape and contour as the mirror of Figure 1. In this form 13 represents a support or body portion formed from suitable transparent material, such as ordinary substantially clear transparent glass. The front face or surface of the support 13 is convex or spherical in all directions. This convex surface is subjected to optical grinding and polishing to give the convex surface an extremely high polish having a radius of curvature of approximately one thousand (1000) millimeters.

The convex or spherical face or surface of the support is provided with a coating or film 14 of a semi-transparent reflecting material, such as chromium, which has a reflectivity of less than 80% which is desirable for various uses. When the mirror of Figure 4 is to be used on an airplane, the coating, layer or film 14 is controlled as to thickness and density to provide the mirror with a reflectivity of approximately 40% to 60%, with a most desirable reflectivity characteristic somewhere between these percentages, say at about 50%.

In the present form, the back or rear face or surface of the support, which as shown is flat, is provided with a layer or coating 15 of some suitable light-absorbing opaque material such, for example, as black paint which will absorb any light rays that might penetrate the mirrored surface 14 and the clear support or body portion 13.

Figure 5:
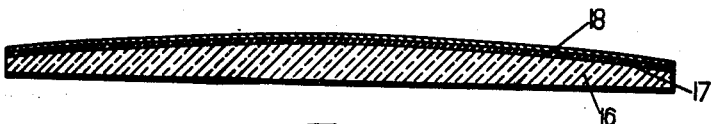
Figure 5 is a view similar to Figures 2 and 4 showing a further modified form of the invention.

Figure 5 is a view similar to Figure 4 and showing a somewhat further modified form of mirror embodying the invention. The support or body portion 16 is preferably formed of some suitable transparent material, such as substantially clear transparent glass. The top face or surface of the support 16, as viewed in Figure 5, is preferably convex or spherical in all directions as in the preceding views. This surface or face is optically ground and highly polished and has a radius of curvature of approximately one thousand (1000) millimeters.

A thin layer or coating 17 of an opaque nature such, for example, as black paint, is applied to the spherical face or surface of the support 16 and to this layer there is applied a semi-transparent layer or film 18 of any suitable semi-transparent material or substance, such as chromium.

Figure 7:
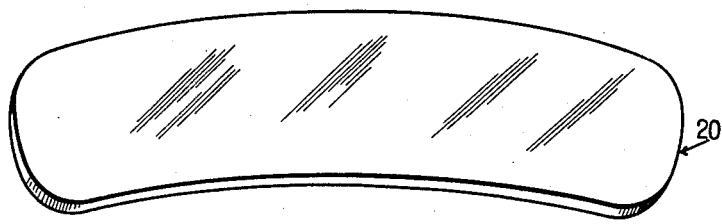
Figure 7 is a perspective view of another mirror embodying the invention.

In Figure 7 there is shown a first surface mirror 20 having somewhat less height and somewhat greater length than mirror 10 of Figure 1. The contour or shape of the mirror of Figure 7 is somewhat different from that of Figure 1 and can be said to be substantially kidney-shaped. As in the preceding forms, this mirror has a face or surface which is convex or spherical in all directions and is preferably built up in the manner of the several forms of mirrors of Figures 1-5, inclusive. Because of the greater length of the instant mirror, the field of view at an equal distance is proportionately greater. The particular shape or outline of the mirror of Figure 7 makes it adaptable for use in locations where the somewhat taller mirror of Figure 1 probably would not fit into the space allowed for installation.

Figure 8:
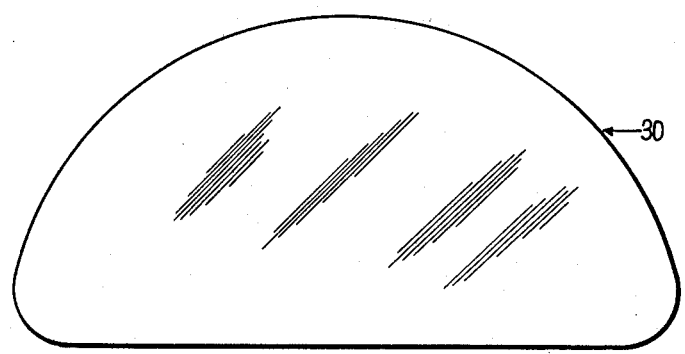
Figure 8 is a front elevational view of still another mirror embodying the present invention.

Figure 8 shows another first surface mirror designated at 30 which is generally similar to the mirror of Figure 1 but which is of somewhat different shape or contour. This mirror will fit into a smaller space than would the mirror 10 of Figure 1. Aside from its shape, it is substantially identical in all respects to the forms of mirrors shown in Figures 1-5, inclusive.

While a wide variety of materials of a reflective nature for the semi-transparent film can be used, it is found that for first surface use practical considerations limit the number of materials which are suitable. Thus, while a silver film of .020 grams per square foot has a reflectivity of 50% and is quite transparent in that it transmits 30% of the light, such films do not adhere to the glass with any real tenacity and can be wiped off with the finger. The same is true of gold films showing this desired reflectivity. Copper films having 10% light transmission show 50% light reflection but like silver films readily tarnish unless protected. In a somewhat similar way some desired thin films of aluminum change through atmospheric action. A silver reflecting film .035 grams per square foot, however, adheres tightly to the glass and shows a light reflection of 80% and a light transmission of 10% and is useful in my first surface mirror.

I have found the use of chromium as the semi-transparent layer to be particularly desirable. Films having a light transparency of between 3% and 20% have reflection values which show in the particularly desired 40% to 60% range. Semi-transparent chromium films firmly adhere to the glass and cannot be rubbed off. Chromium is also extremely hard and resists scratching during cleaning which is particularly important in a first surface mirror as the mirror surface itself is subjected to the cleaning operation. In fighter planes this is particularly important under all conditions and a distinct necessity under desert conditions where everything is constantly covered with grit. The adhesion of the chromium is also completely free from being affected by either the heat of the desert or the cold of high altitudes and by any rapid change from the one extreme temperature to the other. Mirrors made in accordance with the present invention will stand up in extreme and sudden changes of temperature and also against scratching conditions, such as encountered from sand in the desert, in rough field service, and other such conditions. Other mirrors used in fighter planes have not been able to stand up under these various adverse conditions.

Adhesion of chromium is also not affected by contact with water. The adhesion has been found to be improved by the use of the relatively thin semi-transparent chromium layer and scratch resistance is decidedly improved. While ordinary silica grit or dirt will scratch an ordinary opaque chromium layer, the much thinner semi-transparent chromium layer, which gives the desired reflectivity of around 50%, will not scratch. Thus, chromium semi-transparent reflective layers are preferred in that they are completely resistant to the weather and will not corrode under the various atmospheric conditions. These advantageous characteristics make the use of a relatively thin semi-transparent chromium layer particularly desirable for use with first surface mirrors.

Beryllium semi-transparent reflective layers present substantially the same advantages as found with chromium. The films adhere tightly and resist all weather conditions. Platinum, palladium, rhodium, nickel and cobalt can also be used as the semi-transparent reflective mirror films.

The semi-transparent reflective films are preferably formed by thermal evaporation of the materials in a very high vacuum. In making such coatings suitable apparatus known in the art may be used. Multiple electrodes are used for evaporation and known and customary precautions are employed to secure the uniform thickness of coatings. If desired, the coatings or films may be formed by other means, such as electrical sputtering in a vacuum or by chemical deposition.

The invention will be somewhat more apparent from the following examples:

*Example 1*

Figure 6:
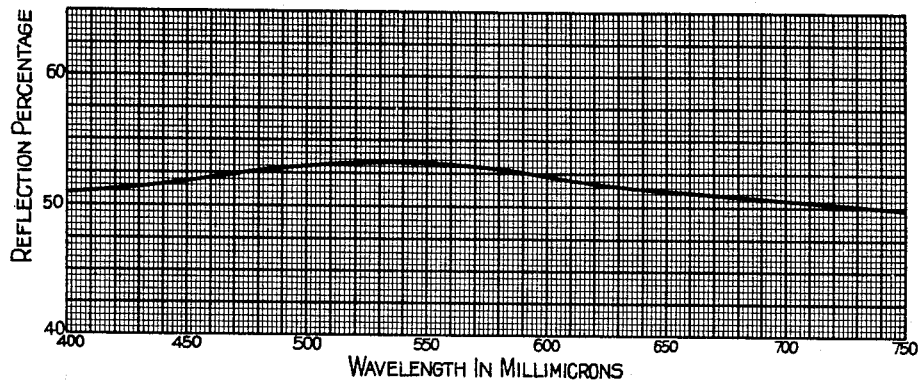
Figure 6 is a diagram illustrating the spectral reflection factor in the visible region of the mirror or reflector of Figures 1, 2 and 3.

A blank of dark opaque glass was formed by casting this into a shape similar to Figure 1 of the drawings. The blank is approximately 2¾ inches high by 5⅜ inches wide. The top surface of the blank was cast as a spherical segment of the approximately desired radius of curvature. For convenience the back surface may be formed as a flat surface. The rough glass blank was then subjected to optical polishing processes to produce a high polish on the surface and to polish the curved face surface so that all parts of it showed the same optical convex contour of a sphere. The radius of curvature of the front surface or face thus produced was approximately 1000 millimeters. The convex glass surface was then thoroughly cleaned and the glass blank mounted in a rack and placed within a high vacuum chamber. After evacuating to approximately $10^{-4}$ millimeters, some chromium was thermally evaporated by heating the chromium within an electrically heated tungsten coil. The film deposited had a reflectivity of approximately 50% and a light transmission value of about 12%. The completed mirror showed a reflectivity of 50% and because of the opaque nature of the glass support, background objects were not apparent. When used in an airplane the mirror was found to eliminate eye fatigue and also prevent glaring contrasts when clouds were viewed therein and it presented extremely sharp images. Due to the curvature of its face surface the mirror presented a horizontal field of view of about 600 feet at a distance of 1000 feet behind the plane and also a vertical field of view of about 300 feet at this distance. The demagnification was 2 to 1. Not a single failure of the mirror or alteration in its reflecting value or separation of the coating or film occurred in planes utilizing the mirror in all types of climates throughout the world. The mirror resisted scratching and was generally of a permanent nature. The mirror of Figure 1 had a spectral reflection curve as shown by the graph or diagram of Figure 6 of the accompanying drawings.

*Example 2*

A mirror blank of clear transparent glass was formed by casting a blank to the shape shown in Figure 7 of the drawings, which blank was approximately 1¾ inches wide by 7 inches long. This glass blank was then optically ground and polished to a spherical radius or surface curvature of 685 millimeters. This glass was then cleaned and given a coating of chromium on the spherical first surface by thermal evaporation as in Example 1. The reflectivity of the semi-transparent layer thus produced was 45% and the light transmission was approximately 16%. The back flat surface of the glass was filled in and coated with a black opaque lacquer or a black asphaltum paint. The mirror produced was stable to all weather conditions and showed a reflectivity of 45%. It functioned entirely as a first surface mirror. The horizontal field of view at a distance of 1000 feet behind the plane was found to be of a width of about 1040 feet.

*Example 3*

A mirror blank of opaque glass was produced and polished in substantially the same manner as in Example 1. In a high vacuum this was given a semi-transparent coating of nickel which had a reflection value of 55%.

*Example 4*

As a rear view mirror suitable for use in automobiles, I produced a mirror by taking an opaque black glass support with flat surfaces and thermally evaporated thereon a thin coating of chromium which showed a reflectivity of 20%. A similar coating on clear glass showed a light transmission of 50%. The first surface mirror thus produced had a reflectivity of 20% and gave sharp clear images and was practically indestructible in that neither the elements nor cleaning destroyed or marred the surface.

*Example 5*

A mirror blank of opaque glass was produced and polished in substantially the same manner as in Example 1. In a high vacuum this was given a reflecting film or coating of silver in the amount of .035 gram per square foot which adheres tightly to the glass and shows a light reflection of approximately 80% and a light transmission of 10%.

It will be apparent from the above that a new mirror has been provided of the first surface type whose reflecting film or coating has a desired reflectivity and which transmits a portion of the light reaching it to a medium that absorbs such transmitted light. While particular modifications of this are very adaptable as mirrors for use in aircraft, the new and improved mirrors of the present invention may be used for various other purposes where a desired reflectivity is necessary with a very substantial decrease of glare and freedom from multiple images.

Having thus described my invention, what I claim is:

A mirror for use in an airplane comprising a glass support and a chromium film on the front surface of said glass support and forming a first surface mirror, said chromium film being partially transparent and having a reflectivity of 40 percent to 60 percent, and said glass support being opaque and absorbing the light passing through said chromium film.

WILLIAM H. COLBERT.